United States Patent Office 2,808,291
Patented Oct. 1, 1957

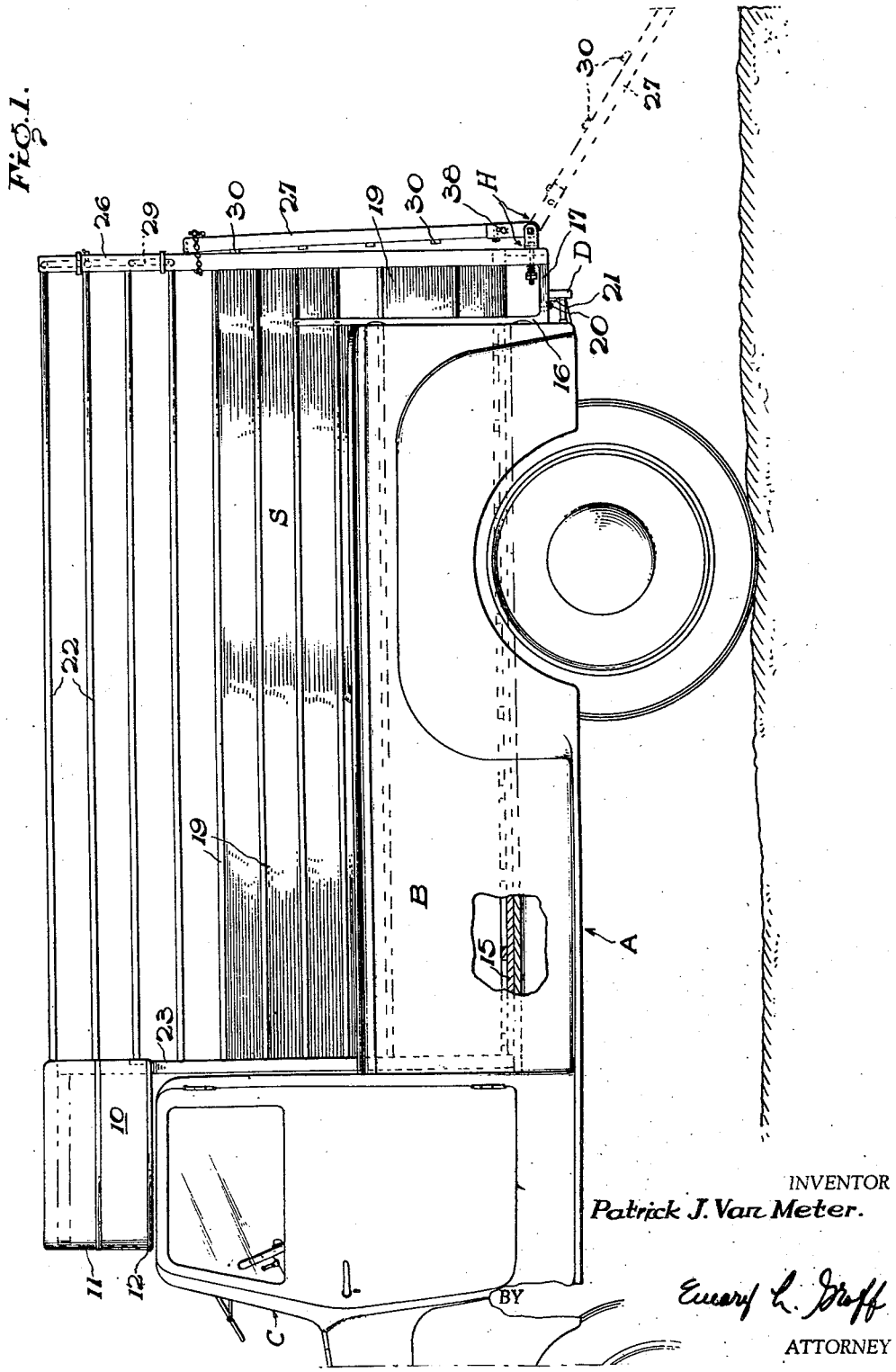

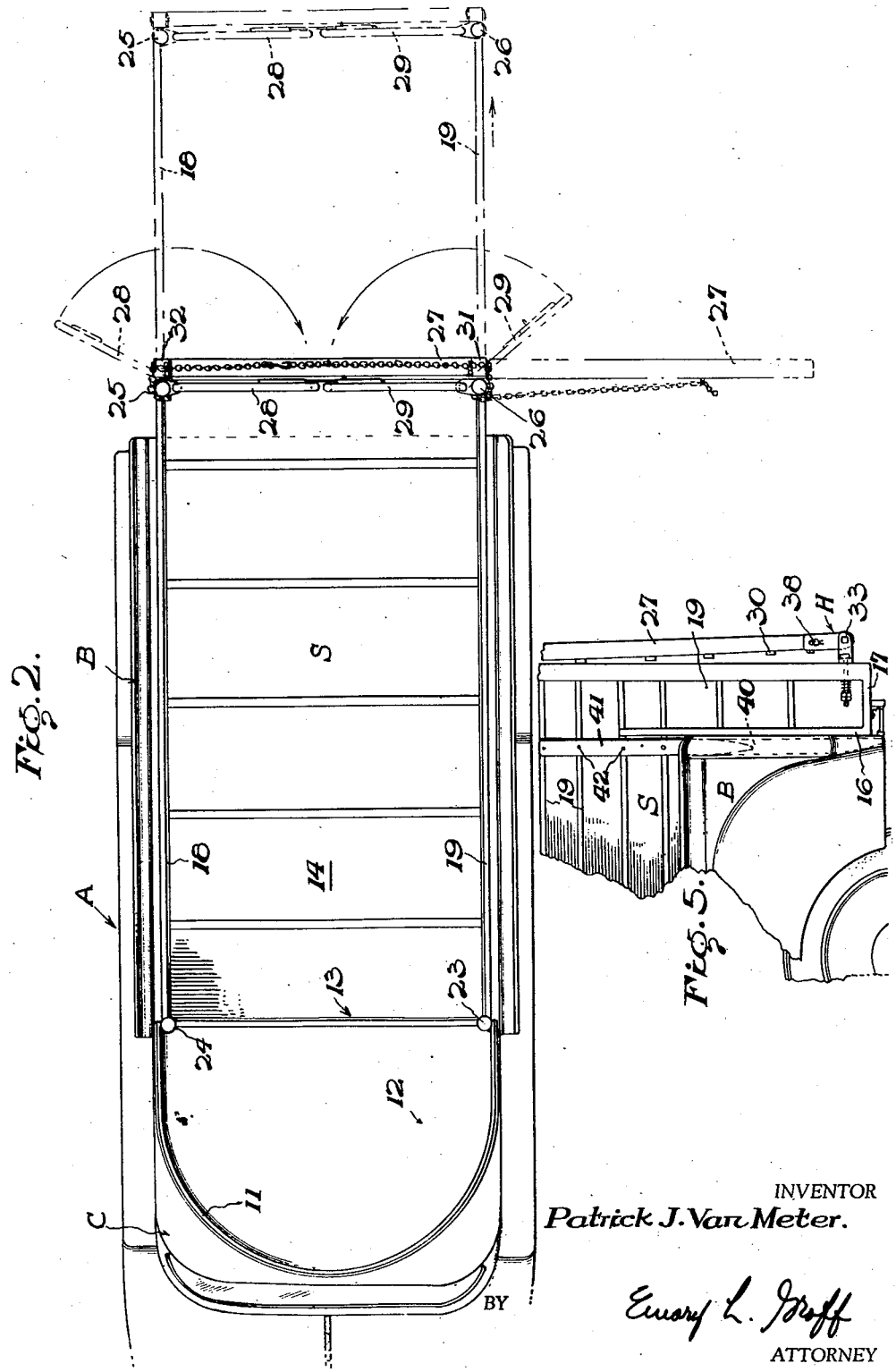

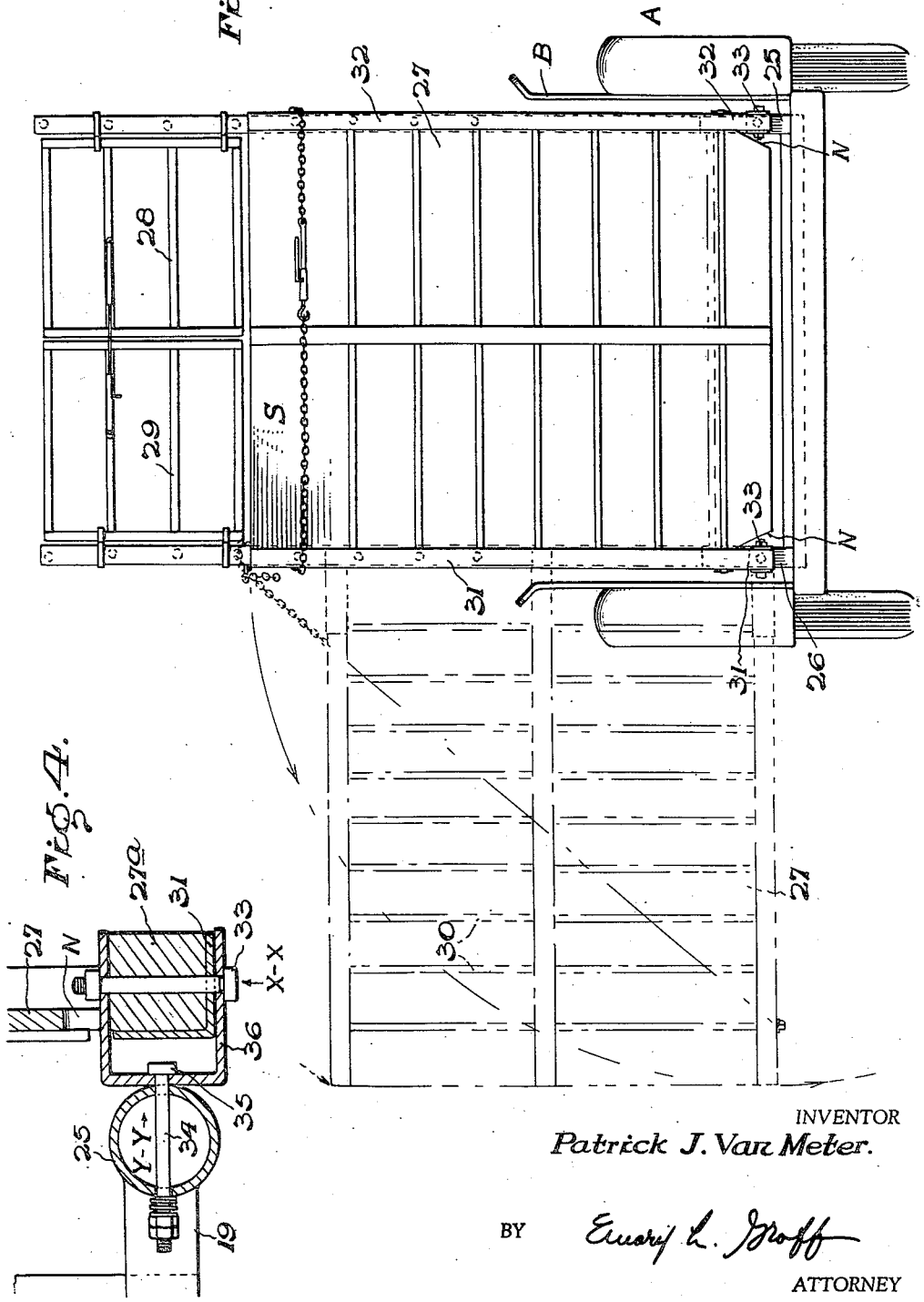

2,808,291
DETACHABLE BODY FOR TRUCKS

Patrick J. Van Meter, Townsend, Mont.

Application January 28, 1954, Serial No. 406,761

3 Claims. (Cl. 296—61)

The present invention relates to a detachable livestock carrier for a commercial truck body, such as the usual well known pick-up truck having a forward passenger cab and an open rear load compartment.

An object of the present invention is to provide a detachable livestock carrier having a head portion adapted to conform to the cab and a main rear body portion with a bottom platform adapted to rest on the floor of the rear load compartment and snugly rest within the load compartment.

Another object is to so shape and proportion the bottom portions of a stock carrier for a conventional pick-up truck as to engage and interlock with the rear bumper thereof and to further provide for the opposite end wall of the carrier body to abut against the rear wall of the passenger cab.

Still another object is to provide for a novel end gate and ramp arrangement in a detachable stock rack or carrier.

The above and other objects and the many advantages of this invention will become apparent upon reference to the following detailed description of one embodiment of the invention when read in connection with the accompanying drawings illustrative of the embodiment.

In the drawings:

Figure 1 is a view in side elevation showing the present invention mounted on a conventional pick-up truck.

Figure 2 is a top plan view of the arrangement of Figure 1.

Figure 3 is a rear end view of the present invention with the novel end gate and ramp combination swung to the side in one position thereof.

Figure 4 is a detailed transverse cross sectional view of the universal hinge and its connections.

Figure 5 is a side view in elevation of the rear portion of the truck and stock rack showing another embodiment of the means for holding or retaining the rack in the truck body.

Referring in detail to the drawings, and first with particular reference to Figure 1, there is illustrated a conventional commercial truck A having a rear load compartment B and a front passenger cab C. Such trucks are known in the industry as pick-up trucks and are of only small load carrying capacity. On the farm it is very often necessary to transport livestock, and unless the farmer is financially able to buy another larger stock truck, he must either rent or borrow one from his neighbor. However, with this novel detachable stock rack or carrier S, which is relatively inexpensive in comparison with a livestock truck, he is able to quickly convert a small pick-up truck into a livestock truck.

This novel stock carrier comprises a novel stepped formation starting at the front thereof from over the truck passenger cab roof to the floor of the truck load compartment B and to the top of the truck's rear bumper D. For example, over the cab the carrier has a feed compartment 10 with solid side walls 11 and a bottom 12; extending downward from the bottom 12 is the end wall 13, see Fig. 2, of the main rear compartment 14 of the stock carrier; and stepped down from the floor 15 of the body 14 and substantially at right angles is a riser 16, which terminates into an elongated ledge or step 17 adapted to rest on the top of the truck's rear bumper D.

The main rear compartment 14, in addition to end wall 13 and floor 15, is comprised of side walls 18 and 19. These side walls 18 and 19 extend rearwardly beyond the length of the truck load compartment B and portions of walls 18 and 19 likewise form side walls at right angles to the step or ledge 17 over the bumper D.

Longitudinally along the bottom surface edge of the ledge or step 17 is an angle iron 20 with one flange 21 thereof extending downwardly behind the edge of the bumper D, so as to latch or hold the carrier in nested position in the truck load compartment B between the said bumper and the rear wall of the cab C.

Each side wall of the carrier body is, for the most part, in skeleton form and comprised of horizontally extending tubes or pipes 22 and may, if desired, have the lower portions of sheet metal with uprights or upstanding tubes 23, 24, 25 and 26 at each corner of the carrier, see Fig. 2. The uprights 25 and 26 at each rear lower corner of the rack or carrier S are provided with a universal hinge indicated in its entirety by the letter H. These hinges serve to support a combination tail gate and ramp 27, while the upper part of the rear of the carrier above the tail gate consists of a pair of oppositely swinging vertically hinged gates 28 and 29. These gates are pivoted to the upper part of uprights 25 and 26, respectively, see Fig. 3.

The tail gate 27 is preferably of solid construction with each opposite bottom corner notched or cut off at an angle at N to accommodate the hinge at each corner. The gate 27 is made with cross beams or tread 30 to serve as animal foot holds when using the same for an animal loading ramp, as hereinafter explained. The opposite side edges of the tail gate 27 have side beams 27ᵃ, and the lower end of each of these beams adjacent each respective notched portion is reinforced with a channel iron member or L-shaped element 31 and 32, respectively, suitably secured thereto. Thus, the respective ends of the reinforced side beams 27ᵃ are spaced from the notched gate edges and each connects with one of the said hinge members H now to be described, see Figs. 1 and 4.

Each of these universal hinge members comprises an axis x—x and an axis y—y at right angles to each other. For example, each respective axis x—x comprises a bolt 33 to permit the tail gate to swing vertically upward and downward, thereby serving as a loading ramp when the free end of the gate is swung down into ground engagement, see Fig. 1. Next each axis y—y comprises a bolt 34 with a head 35, and a U-shaped bracket 36, the base of which is swivelled on the said bolt head. The bolt 34 of each hinge extends through the lower part of its associated corner upright 25 or 26 and the base of the U-shaped bracket 36, so as to swivelly mount the same on the said bolt 34 in its bolt head 35. The arms of each bracket 36 embrace a side beam end 27ᵃ, and its respective reinforcement 31 or 32, and each arm is formed with aligned apertures to receive the aforesaid bolt 33 of its respective axis x—x at right angles to the shank of the bolt 34 of the hinge H, which froms an axis y—y, see Fig. 4.

Normally, the axis y—y is dormant and the axis x—x is used to permit the free end of the tail gate 17 to swing down to the ground and serve as a ramp, as shown in Figure 1. Or it may be used simply as a gate or as the side of a supplemental loading chute, not shown, and can be turned to the side by end over end rotation on the axis y—y of the gate in a vertical plane after removing one of the bolts 33 on the x—x axis from one side of the carrier body, as shown in Figure 3.

When the gate is turned to the side on an axis y—y, the bracket 36 swivels around the bolt 34 supported by the pipe 25 or 26, as the case may be, to such side position shown in dotted lines.

With the gate 27 thus to the side it serves as a guard to keep the stock on a ramp or the like not shown, which may be placed in position to the rear of the handling carrier.

The gate 27 when solely on axis y—y may be held at the upper end of upright 25 by a chain of proper length fastened to the upright 25 and a side of the tail gate 27 to stop the turn on the axis y—y and thus hold the gate in a stable side position.

Also, when the gate is swung upward to a closed position on the axis x—x, a tie chain from post 25 to post 26 around the upper part thereof will hold the same raised to such closed position. When an x—x axis pin or bolt 33 is removed from one side of the gate, the bolt or pin 33 is inserted into the opening 38 in the opposite side of the gate frame (see Fig. 1), until the gate is returned to normal position across the rear of the carrier.

The illustration in Figure 5 shows another arrangement for retaining a stock carrier in position in a truck body. This is intended for use with a truck which does not have a bumper and instead is equipped with a slot 40 formed in the side of the truck body to accommodate a locking bar 41 of suitable material. This bar 41 may be attached to the side of the stock carrier or rack by means such as rivets or bolts 42.

Thus, when the stock carrier is positioned in the truck body, it is raised slightly to permit the bar 41 to drop into the slot 40 and the same becomes locked in the vehicle rear load compartment B.

Operation

It is believed the use of the device is generally apparent from the foregoing description, but specifically the "pick-up" truck is loaded with the stock carrier by sliding the same into the truck's load compartment, until the carrier's forward end wall abuts the rear wall of the truck passenger cab C and the flange 21 of the angle iron 20 on ledge 17 drops down behind the bumper D.

After the carrier S is thus nested in the truck, it may be loaded with livestock by lowering the tail gate 27 on the axes x—x of each hinge H to the ground for use as a ramp. Then if the ramp is not needed and the carrier is to be loaded with bulk material packages or the like, then one of the bolts 33 of the x—x axis of hinge H is removed from its bracket 36 and placed in the hole 38. This releases one corner of the gate 27 and permits the opposite other corner to be turned on the bolt 34 of the axis y—y of the opposite hinge H to the side position shown in Figure 3 until stopped by the check chain tethered between the post and the gate side.

During any use of the tail gate 27 for a ramp or for a side guard or opening, the upper gates 28 and 29 may be kept closed or swung open as desired.

When the gate is to again be used as a ramp, the hinge pin or bolt 33 is removed from hole 38 and the gate corner swung back to its hinge, whereupon the bolt is reinserted in the bracket 36.

Thus, there is provided a detachable carrier for goods or livestock, which is nestable within a truck body having a much lower load capacity, thereby making it possible to own the equivalent of two trucks, one for small pick-up and the other for carrying greater loads and livestock.

While only one embodiment of the invention has been illustrated and described, other changes and modifications, which will now appear to those skilled in the art, may be made without departing from the scope of the present invention. Reference is, therefore, to be had to the appended claims for a definition of the limits of the present invention.

I claim:

1. A hinge construction for pivotally supporting a tail gate at the rear end of a rectangular body compartment having an upright at each of the two rear corners thereof and wherein said tail gate comprises a pair of side beams; comprising a pair of U-brackets, a pivot bolt extending through the base of each bracket and through a corresponding upright transversely thereof, and a removable pivot bolt extending through the opposed legs of each bracket and through the lower end of a corresponding tail gate beam with the pivot bolts associated with each bracket being in right angular relation, the last named pivot bolts providing for swinging said tail gate alternately to closed and ground engaging position, and either one of said first named pivot bolts providing for over end turning of the gate upon removal of an opposing one of said last named pivot bolts.

2. In a stock carrier having side walls, a combined tail gate and ramp, a pivot bolt removably supported by the bottom edge of each side wall whose common axes are transverse to said side walls and on which the lower edges of said tail gate and ramp is pivoted for swinging movement between a vertical carrier rear end closing position and a ground engaging position, and said pivot bolts being pivotally supported by said side walls on axes normal to the axes of the bolts whereby said combined tail gate and ramp is capable of being swung transverse of said side walls and toward one or the other upon removal of one or the other of said pivot bolts.

3. In an elongated body compartment, a single normally vertical tail gate closure for the rear end of said compartment, said body compartment being provided with a removable pivot bolt at each side thereof on which the laterally opposed lower corners of said gate are pivoted on an axis at right angles to the central longitudinal vertical plane of said compartment for swinging said gate from said normal vertical position to a ground engaging position of the upper end thereof, and vice-versa, and said bolts having pivotal connections with said body compartment for swinging said gate about one or the other lower corner thereof on a horizontal axis parallel with said plane upon removal of one or the other of said bolts.

References Cited in the file of this patent

UNITED STATES PATENTS

| | | |
|---|---|---|
| 2,173,076 | Stetson | Sept. 12, 1939 |
| 2,246,358 | Jelinek | June 17, 1941 |
| 2,374,697 | Palisano et al. | May 1, 1945 |
| 2,559,029 | Randolph | July 3, 1951 |
| 2,601,684 | Martin | July 1, 1952 |
| 2,626,182 | Troth et al. | Jan. 20, 1953 |
| 2,632,917 | Schwering | Mar. 31, 1953 |
| 2,754,537 | Rose | July 17, 1956 |

FOREIGN PATENTS

| | | |
|---|---|---|
| 371,762 | Great Britain | Apr. 28, 1932 |